(12) United States Patent
Mishima et al.

(10) Patent No.: US 9,229,493 B2
(45) Date of Patent: Jan. 5, 2016

(54) DISPLAY DEVICE

(75) Inventors: Yasuyuki Mishima, Mobara (JP);
Keiichiro Takahashi, Mobara (JP)

(73) Assignee: JAPAN DISPLAY INC., Tokyo (JP)

( * ) Notice: Subject to any disclaimer, the term of this patent is extended or adjusted under 35 U.S.C. 154(b) by 154 days.

(21) Appl. No.: 13/460,904

(22) Filed: May 1, 2012

(65) Prior Publication Data

US 2012/0280968 A1    Nov. 8, 2012

(30) Foreign Application Priority Data

May 6, 2011   (JP) .................. 2011-103412

(51) Int. Cl.
  *G06F 1/18*   (2006.01)
  *G09G 3/36*   (2006.01)
  *G02F 1/1333*  (2006.01)

(52) U.S. Cl.
  CPC  *G06F 1/182* (2013.01); *G09G 3/36* (2013.01); *G02F 1/13338* (2013.01); *G02F 2001/133334* (2013.01)

(58) Field of Classification Search
  CPC .................. G09G 3/36; G06F 1/182
  USPC .................. 345/87–104, 173–179
  See application file for complete search history.

(56) References Cited

U.S. PATENT DOCUMENTS

| | | | |
|---|---|---|---|
| 4,773,738 A * | 9/1988 | Hayakawa et al. | 349/34 |
| 2003/0058204 A1* | 3/2003 | Moon | 345/87 |
| 2003/0234873 A1* | 12/2003 | Ishida et al. | 348/226.1 |
| 2005/0088105 A1* | 4/2005 | Tajiri et al. | 315/169.3 |
| 2008/0150874 A1* | 6/2008 | Kida et al. | 345/100 |
| 2008/0239177 A1* | 10/2008 | Sekine et al. | 349/15 |
| 2010/0171896 A1* | 7/2010 | Yoshida et al. | 349/48 |

FOREIGN PATENT DOCUMENTS

JP    2000-231120    8/2000

* cited by examiner

*Primary Examiner* — Kevin M Nguyen
*Assistant Examiner* — Cory Almeida
(74) *Attorney, Agent, or Firm* — Lowe Hauptman & Ham, LLP

(57) ABSTRACT

A display device is provided which includes a display panel having pixels, each pixel having a pixel electrode, a common electrode, an image line to supply an image signal to the plurality of pixels, and a transparent conductive film disposed at a surface on a viewer side. The display device display panel, also includes a voltage generation unit to supply a voltage having an AC component superposed on a DC component to the transparent conductive film. The AC component is a voltage with reverse polarity with respect to a spike-shaped voltage occurring at the transparent conductive film to thereby cancel out effects of the spike-shaped voltage on the transparent conductive film.

11 Claims, 7 Drawing Sheets

FIG.8A
FIG.8B
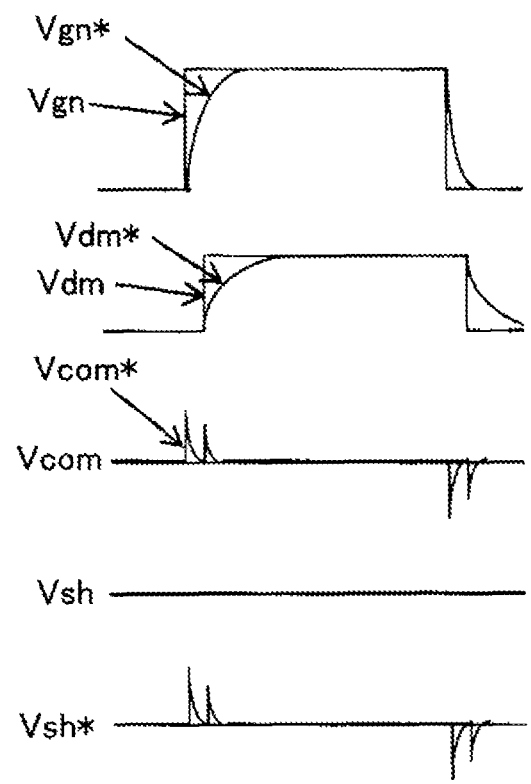
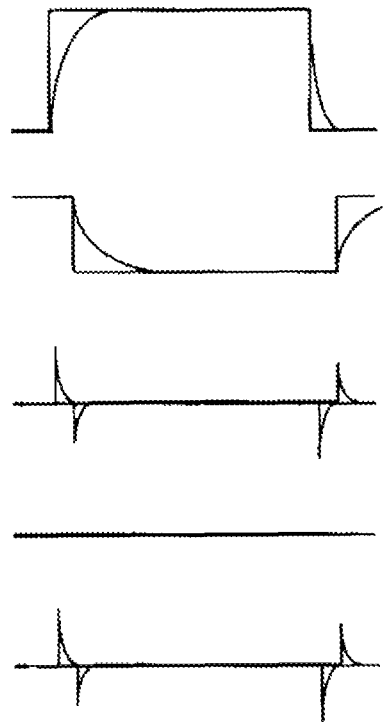

DISPLAY DEVICE

CROSS-REFERENCE TO RELATED APPLICATION

The present application claims priority from Japanese application JP 2011-103412, filed on May 6, 2011, the content of which is hereby incorporated by reference into this application.

BACKGROUND OF THE INVENTION

1. Field of the Invention

The present invention relates to a display device, and more particularly to a technique for reducing noise which is generated from a display panel of a display device.

2. Description of the Related Art

Display devices provided with a device (hereinafter, referred to as a touch sensor or a touch panel) where a touch operation (a touch pressing operation, which is hereinafter simply referred to as touch) is performed for a display screen with the finger of a user, a pen, or the like and thereby information is input are used in mobile electronic apparatuses such as PDAs or portable terminals, various home appliances, automated teller machines, and the like.

As such a touch panel, a resistance film type where a resistance value variation at a touched portion is detected, a capacitance type where a capacitance variation is detected, or an optical sensor type where a light amount variation is detected is known.

At present, in the display device with the touch panel, there is a problem in that detection accuracy of the touch panel is decreased due to the influence of noise which is generated from the display device (for example, a liquid crystal display device or the like) disposed under the touch panel.

JP 2000-231120 A discloses an example of the related art.

SUMMARY OF THE INVENTION

As described above, in the display device with the touch panel, there is a problem in that detection accuracy of the touch panel is decreased due to the influence of noise which is generated from the display device (for example, a liquid crystal display device or the like) disposed under the touch panel.

Particularly, in a case where the display device is an IPS (In Plane Switching) liquid crystal display device, shieldability of a color filter side for electromagnetic waves is weaker than that in other liquid crystal display devices. For this reason, as a countermeasure for the above-described problem, a transparent conductive film (for example, an ITO (Indium Tin Oxide) film) with low resistance is formed on the rear surface side of the touch panel. In addition, in order to apply a ground potential (GND) to the transparent conductive film with low resistance, a rear surface printed wiring board is mounted on the transparent conductive film by a FOG method. As a result, there are disadvantages in that costs are increased, performance (transmittance) is deteriorated, and the like. Under these circumstances, it is desirable to increase the shieldability of the display device (even the IPS liquid crystal display device).

The present invention has been made based on these findings, and an object of the present invention is to provide a display device capable of improving the shieldability.

The above-described and other objects and novel features of the present invention will become clear from the description of the present specification and the accompanying drawings.

Of the inventions disclosed in the present application, a summary of representative inventions is as follows.

(1) According to an aspect of the present invention, there is provided a display device including a display panel including plural pixels; and a transparent conductive film disposed at a surface on a viewer side of the display panel. A voltage where an AC component is superposed on a DC component is supplied to the transparent conductive film.

(2) In the display device according to (1), the display panel may further include a common electrode, and the AC component supplied to the transparent conductive film may be a voltage which is varied so as to have a reverse polarity to a voltage variation of the common electrode.

(3) In the display device according to (2), the display panel may further include a common voltage line that supplies a common voltage to the common electrode; and an inverting amplification circuit to which a voltage of the common electrode or the common voltage line is input. A voltage output from the inverting amplification circuit is supplied to the transparent conductive film.

(4) In the display device according to any one of (1) to (3), the display panel may further include an image line that inputs an image voltage to each of the pixels, and the AC component supplied to the transparent conductive film is a spike-shaped voltage which may be varied so as to have a reverse polarity to a spike-shaped voltage occurring at the transparent conductive film due to a level variation of the image voltage supplied to the image line.

(5) In the display device according to any one of (1) to (3), the display panel may further include a scanning line that inputs a scanning voltage to each of the pixels, and the AC component supplied to the transparent conductive film is a spike-shaped voltage which may be varied so as to have a reverse polarity to a spike-shaped voltage occurring at the transparent conductive film due to a level variation of the scanning voltage supplied to the scanning line.

(6) The display device according to any one of (1) to (5) may further include a polarizer provided on the transparent conductive film, the display panel may be a liquid crystal display panel which includes a pair of substrates and a liquid crystal layer interposed between the pair of substrates, and the transparent conductive film may be provided at a surface on a viewer side of the display panel of the pair of substrates.

(7) The display device according to any one of (1) to (3) may further include a polarizer provided on the transparent conductive film, the display panel may be a liquid crystal display panel that includes a pair of substrates; a liquid crystal layer interposed between the pair of substrates; plural image lines that input image voltages to the plural pixels; plural scanning lines that input scanning voltages to the plural pixels; and an image line driving circuit that supplies the image voltages to the respective image lines. Here, each of the pixels may include a first color sub-pixel, a second color sub-pixel, and a third color sub-pixel, and the plural image lines may include an image line A for the first color sub-pixel, an image line B for the second color sub-pixel, and an image line C for the third color sub-pixel. In addition, the display device further may include an RGB switch circuit that distributes image voltages output from the image line driving circuit into the image line A, the image line B or the image line C, one horizontal scanning period may be divided into a first period, a second period, and a third period, and the RGB switch circuit may supply the image voltages output from the image line driving circuit to the image line A during the first period, to the image line B during the second period, and to the image line C during the third period.

(8) In the display device according to (7), the AC component supplied to the transparent conductive film may be a spike-shaped voltage which is varied so as to have a reverse polarity to a spike-shaped voltage occurring at the transparent conductive film due to a level variation of the image voltage supplied to the image line.

(9) In the display device according to (7), the AC component supplied to the transparent conductive film may be a spike-shaped voltage which is varied so as to have a reverse polarity to a spike-shaped voltage occurring at the transparent conductive film due to a level variation of the scanning voltage supplied to the scanning line.

(10) In the display device according to (7), the AC component supplied to the transparent conductive film may be a spike-shaped voltage which is varied so as to have a reverse polarity to a spike-shaped voltage occurring at the transparent conductive film due to a level variation of a switching signal input to the RGB switch circuit.

Of the inventions disclosed in the present application, brief description of an effect achieved by the representative inventions is as follows.

According to the present invention, it is possible to improve shieldability of a display device.

BRIEF DESCRIPTION OF THE DRAWINGS

FIGS. 5A and 5B are waveform diagrams illustrating voltage waveforms of the respective parts of the liquid crystal display device according to the embodiment of the present invention, wherein FIG. 5A is a diagram illustrating voltage waveforms when positive driving is performed and FIG. 5B is a diagram illustrating voltage waveforms when negative driving is performed.

FIGS. 8A and 8B are waveform diagrams illustrating voltage waveforms of the respective parts of the liquid crystal display device in the related art shown in FIG. 7, wherein FIG. 8A is a diagram illustrating voltage waveforms when positive driving is performed and FIG. 8B is a diagram illustrating voltage waveforms when negative driving is performed.

DETAILED DESCRIPTION OF THE INVENTION

Figure 1:
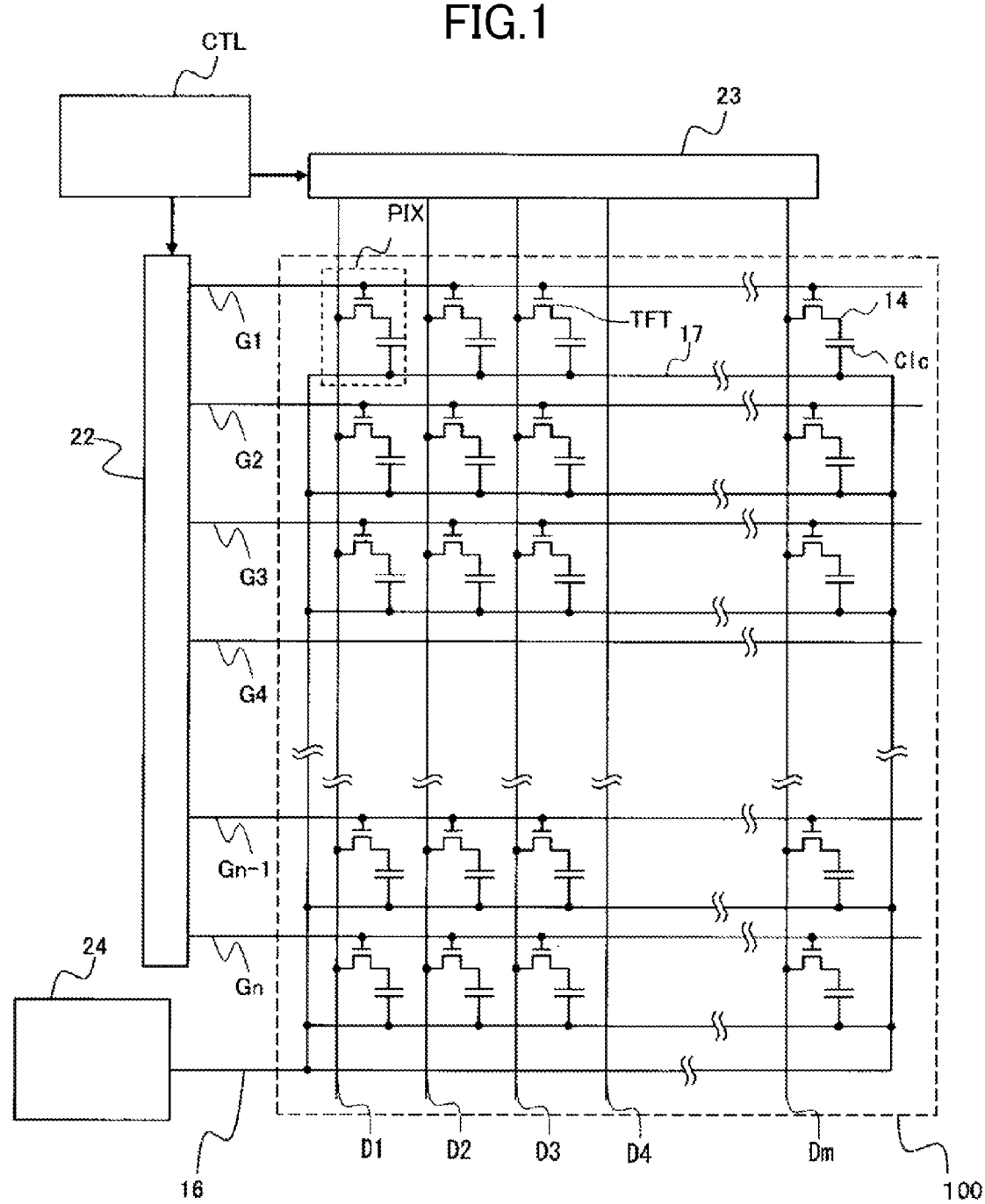
FIG. 1 is a diagram illustrating an equivalent circuit of a liquid crystal display device according to an embodiment of the present invention.

Hereinafter, embodiments of the present invention will be described in detail with reference to the drawings.

In addition, in the drawings for describing the embodiments, constituent elements having the same function are given the same reference numerals, and repeated description will be omitted. In addition, the following embodiments do not limit the construction of the claims of the present invention.

Embodiments

FIG. 1 is a diagram illustrating an equivalent circuit of a liquid crystal display device according to an embodiment of the present invention.

As shown in FIG. 1, a display portion 100 of the liquid crystal display panel includes pixels PIX arranged in a matrix.

Each pixel PIX is disposed at an intersection region (a region surrounded by four signal lines) of two adjacent image lines D and two adjacent scanning signal lines G. Each pixel PIX includes a thin film transistor TFT, a pixel electrode 14 connected to a source electrode (or a drain electrode) of the thin film transistor TFT, and a common electrode 17 which is opposite to the pixel electrode 14 with a liquid crystal layer interposed therebetween. In addition, the reference numeral Clc denotes a liquid crystal capacitor which is an equivalent expression for the liquid crystal layer. Further, in FIG. 1, a storage capacitor formed between the common electrode 17 and the pixel electrode 14 is not shown.

The drain electrode (or the source electrode) of the thin film transistor TFT of each of the pixels PIX arranged in the column direction is connected to the image line D, and each image line D is connected to an image line driving circuit (also referred to as a drain driver or a source driver) 23 which supplies an image voltage (grayscale voltage) corresponding to display data.

In addition, the gate electrode of the thin film transistor TFT of each of the pixels PIX arranged in the row direction is connected to the scanning signal line G, and each scanning line G is connected to a scanning line driving circuit (also referred to as a gate driver) 22 which supplies a scanning voltage (a positive or negative bias voltage) to the gate electrode of the thin film transistor TFT for one horizontal scanning period.

In FIG. 1, the reference numeral CTL denotes a display control circuit (also referred to as a timing controller).

The display control circuit CTL controls and drives the image line driving circuit 23 and the scanning line driving circuit 22 on the basis of the respective display control signals such as clock signals CL, a display timing signal DTMG, a horizontal synchronization signal HSYNC, and a vertical synchronization signal VSYNC, and display data RGB, which are transmitted from a computer main body side.

When the display timing signal is input, the display control circuit CTL determines the signal as a display starting timing, and outputs received display data of one line to the image line driving circuit 23 via a bus line of the display data.

At this time, the display control circuit CTL outputs a display data latch clock signal CL2 to the image line driving circuit 23 via a signal line. Here, the display data latch clock signal is a display control signal for latching the display data in a data latch circuit of the image line driving circuit 23.

The display control circuit CTL determines that latch of the display data corresponding to one horizontal period is completed if the input of the display timing signal is finished, or a predetermined time has elapsed from the input of the display timing signal, and outputs an output timing control clock signal CL1 to the image line driving circuit 23 via the signal line. Here, the output timing control clock signal CL1 is a display control signal for outputting the display data accumulated in the latch circuit of the image line driving circuit 23 to the images lines D1 to Dm of the liquid crystal display panel.

Thereby, the image line driving circuit 23 supplies image voltages corresponding to display data to the image lines D1 to Dm every one horizontal scanning period.

In addition, when the first display timing signal is input after the vertical synchronization signal is input, the display control circuit CTL determines it as the first display line, and outputs a frame start instruction signal FLM to the scanning line driving circuit 22 via the signal line.

In addition, the display control circuit CTL outputs a shift clock signal CL3 to the scanning line driving circuit 22 via the signal line with the cycle of one horizontal period on the basis of the horizontal synchronization signal. Thereby, the scanning line driving circuit 22 sequentially selects the scanning lines G1 to Gn downward from above or upward from below every one horizontal period, and applies a positive bias voltage to the selected scanning lines, and plural thin film transistors TFT connected to the selected scanning lines are turned on for one horizontal scanning period.

The voltages applied to the image lines D1 to Dm are applied to the pixel electrodes 14 via the thin film transistors TFT which are turned on for one horizontal scanning period, and, finally, charge is accumulated in the storage capacitor (not shown) and the liquid crystal capacitors Clc. Liquid crystal molecules are controlled by an electric field applied to the liquid crystal molecules, thereby displaying images.

Figure 2:
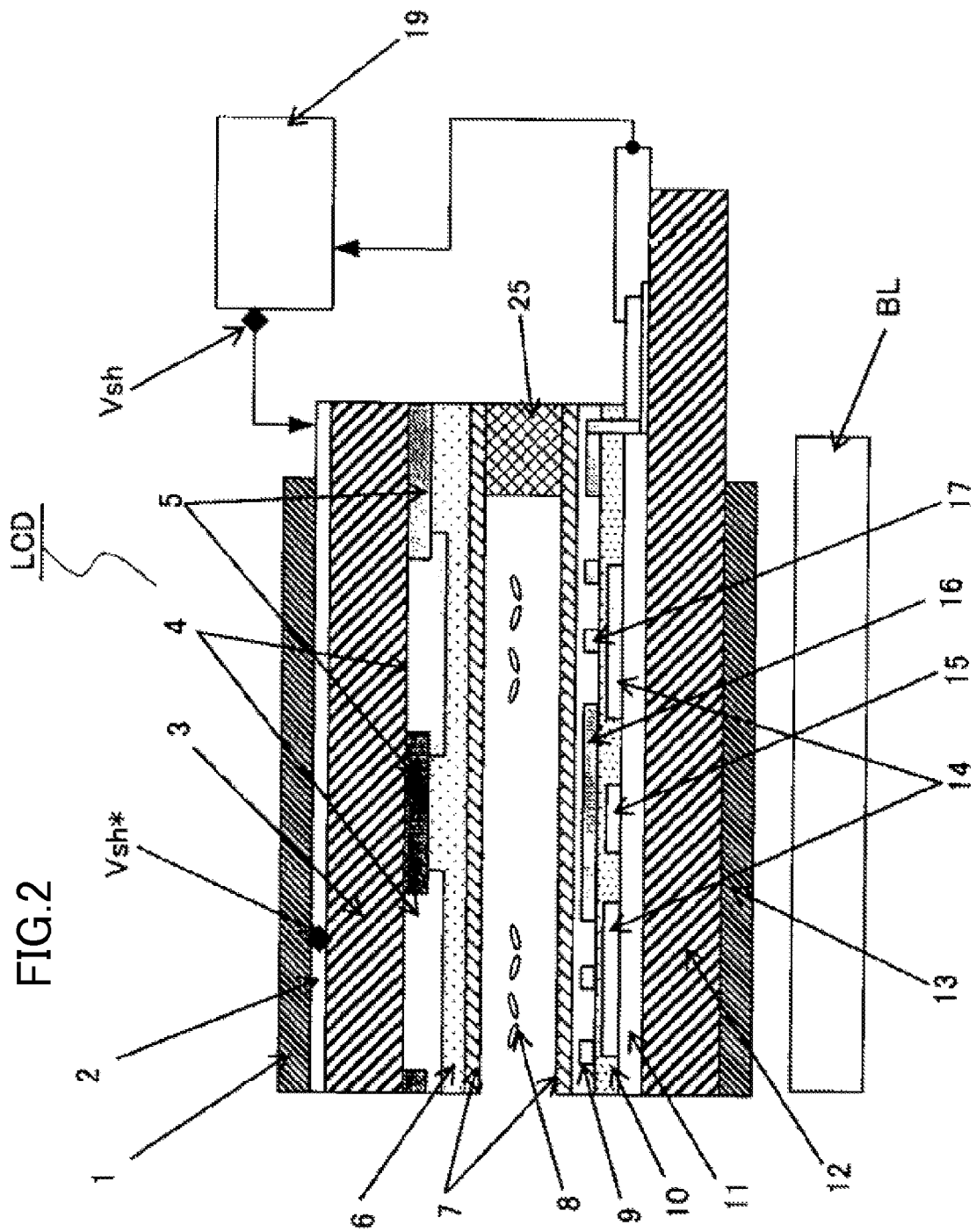
FIG. 2 is a schematic cross-sectional view illustrating a cross-sectional structure of liquid crystal display panel main parts according to the embodiment of the present invention.

FIG. 2 is a schematic cross-sectional view illustrating a cross-sectional structure of the liquid crystal display panel main parts according to the embodiment of the present invention.

The liquid crystal display device according to the embodiment includes a liquid crystal display panel LCD and a backlight BL disposed under the liquid crystal display panel LCD.

The liquid crystal display panel LCD has a first substrate 12 (also referred to as a TFT substrate) and a second substrate 3 (also referred to as a CF substrate) with the liquid crystal layer 8 interposed therebetween. In addition, in the liquid crystal display panel according to the present embodiment, the main surface side of the second substrate 3 is a viewing side.

As shown in FIG. 2, on the liquid crystal layer side of the first substrate 12, a first insulating layer 11, the pixel electrodes 14, the image line 15, a second insulating layer 10, the common electrode 17, a common electrode line 16, a third insulating layer 9, and an alignment layer 7 are formed in this order from the first substrate 12 to the liquid crystal layer 8. In addition, a lower polarizer 13 is provided on the outer surface of the first substrate 12.

On the liquid crystal layer side of the second substrate 3, black matrices (light blocking layers) 5, red, green and blue color filter layers 4, a planarization layer 6, and an alignment layer 7 are formed in this order from the second substrate 3 to the liquid crystal layer 8. In addition, a transparent conductive film 2 is provided on the outer surface of the second substrate 3, and a polarizer 1 is provided on the transparent conductive film 2.

In the present embodiment, a voltage where an AC component for cancelling out noise is superposed on a DC component is applied to the transparent conductive film 2 by an AC voltage generation circuit 19. In the present specification, the AC component indicates a voltage component which is generated periodically, and, includes, for example, a pulse-shaped voltage or a spike-shaped voltage.

In addition, in the liquid crystal display panel shown in FIG. 2, the pixel electrode 14 is formed in a plane shape, and the common electrode 17 is an electrode having plural slits.

Although not shown in detail, the backlight BL includes a mold, a light source, a light guiding plate, an optical sheet group, and a reflection sheet.

Figure 3:
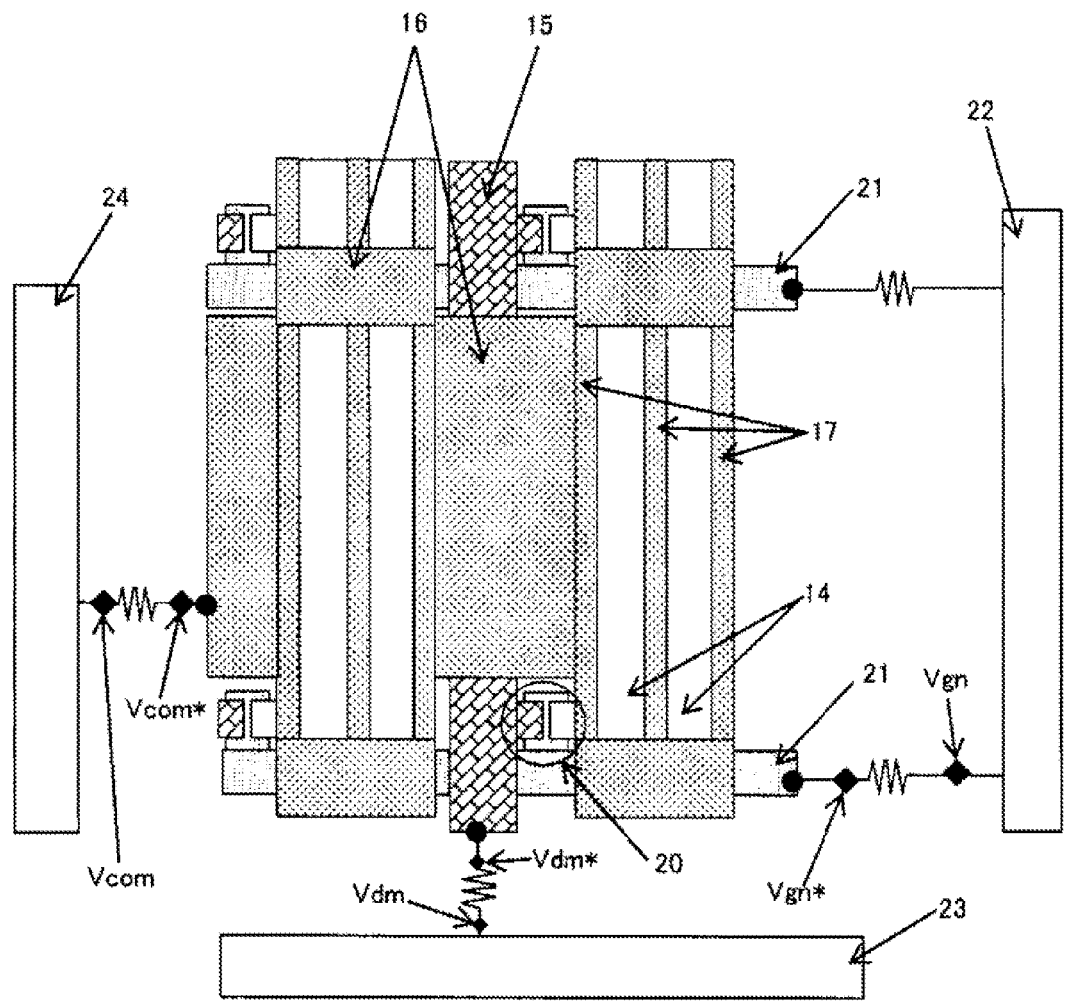
FIG. 3 is a diagram illustrating a pixel configuration according to the embodiment of the present invention.

FIG. 3 is a diagram illustrating a pixel configuration of the embodiment of the present invention.

In FIG. 3, the reference numeral 15 denotes the image line, the reference numeral 21 denotes the scanning line, and the scanning line 21 and the image line 15 are disposed so as to intersect each other.

A thin film transistor 20 is disposed at the position where the scanning line 21 and the image line 15 intersect each other. A gate electrode of the thin film transistor 20 is connected to the scanning line 21, and a drain electrode (or a source electrode) of the thin film transistor 20 is connected to the image line 15.

Here, the image line 15 is connected to the image line driving circuit 23, and the image line driving circuit 23 supplies an image voltage to the image line 15. The scanning line driving circuit 22 supplies a scanning voltage (a non-selection scanning voltage or a selection scanning voltage) to the scanning line 21.

In addition, the common electrode 17 is connected to a common electrode driving circuit 24 via the common electrode line 16, and the common electrode driving circuit 24 supplies a common voltage to the common electrode 17. Here, in a case where an AC driving method of the liquid crystal display panel LCD is a common symmetry method such as a dot inversion method, a constant potential (for example, a ground potential GND) is supplied to the common electrode 17.

In addition, although, in the present embodiment, the slit-shaped common electrode 17 is disposed at the upper side of the second insulating layer 10 and the plane-shaped pixel electrode 14 is disposed at the lower side of the second insulating layer 10, the slit-shaped pixel electrode 14 may be disposed at the upper side of the second insulating layer 10 and the plane-shaped common electrode 17 may be disposed at the lower side of the second insulating layer 10. In addition, the slit-shaped common electrode 17 may be disposed at the upper side of the second insulating layer 10 and the slit-shaped pixel electrode 14 may be disposed at the lower side of the second insulating layer 10, or the slit-shaped pixel electrode 14 may be disposed at the upper side of the second insulating layer 10 and the slit-shaped common electrode 17 may be disposed at the lower side of the second insulating layer 10.

Figure 7:
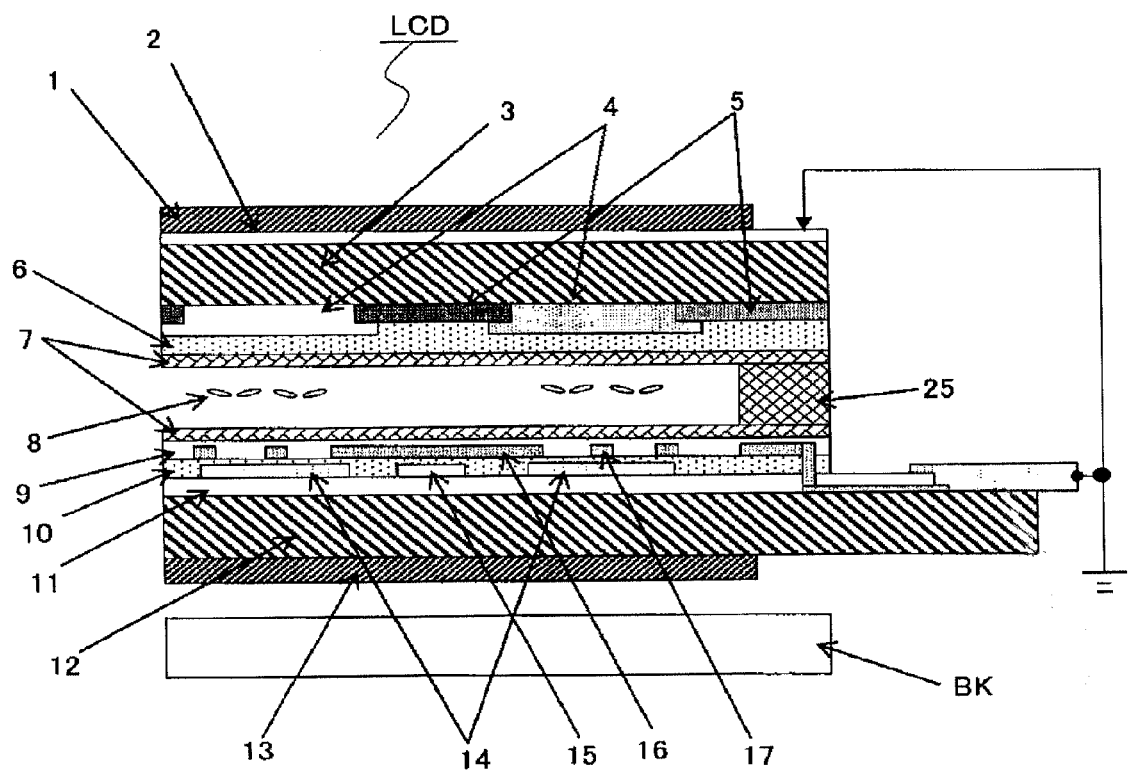
FIG. 7 is a schematic cross-sectional view illustrating a cross-sectional structure of a main part of a liquid crystal display panel in the related art.

FIG. 7 is a schematic cross-sectional view illustrating a cross-sectional structure of a liquid crystal display panel LCD in the related art.

When the liquid crystal display panel LCD according to the present embodiment shown in FIG. 2 is compared with the liquid crystal display panel LCD in the related art shown in FIG. 7, a generation circuit which applies power or voltage to the transparent conductive film 2 formed on an opposite side to the liquid crystal layer side of the second substrate 3 is the AC voltage generation circuit 19 in the liquid crystal display panel LCD according to the present embodiment, whereas it is a DC power supply in the liquid crystal display panel LCD in the related art.

Figure 4:
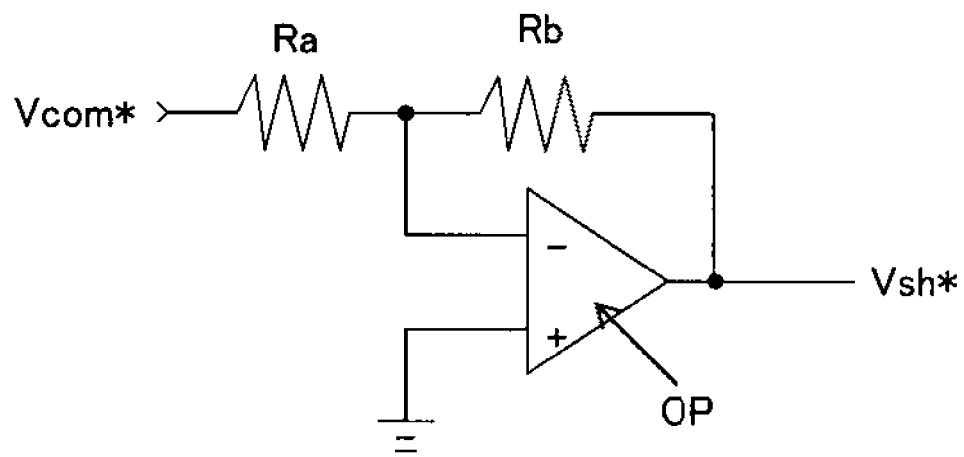
FIG. 4 is a circuit diagram illustrating a circuit configuration of an inverting amplification circuit which is the AC voltage generation circuit shown in FIG. 2.

FIG. 4 is a circuit diagram illustrating a circuit configuration of an inverting amplification circuit which is the AC voltage generation circuit 19 shown in FIG. 2. The inverting amplification circuit shown in FIG. 4 includes an operational amplifier OP and resistive elements Ra and Rb.

In the present embodiment, the AC voltage generation circuit 19 is constituted by the inverting amplification circuit shown in FIG. 4. An input signal of the inverting amplification circuit is a voltage Vcom* of the common electrode line 16 (or the common electrode 17) of the first substrate 12. In addition, resistance values of the resistive elements Ra and Rb are set to appropriate and optimal values on the basis of resistance values of the respective lines or the transparent conductive films or capacitance values between the transparent conductive films.

FIGS. 8A and 8B are waveform diagrams illustrating voltage waveforms of the respective parts of the liquid crystal display device in the related art shown in FIG. 7, wherein FIG. 8A shows voltage waveforms when positive driving is performed, and FIG. 8B shows voltage waveforms when negative driving is performed. Note that the wave form diagrams shown in FIGS. 8A and 8B are measured and found by the inventors.

In addition, in FIGS. 8A and 8B, Vgn denotes a selection scanning voltage waveform supplied from the scanning line driving circuit 22 to the scanning line 21, Vgn* denotes a selection scanning voltage waveform input to the gate electrode of the thin film transistor 20, Vdm denotes an image voltage waveform supplied from the image line driving circuit 23 to the image line 15, Vdm* denotes an image voltage waveform input to the pixel electrode 14, Vcom denotes a common voltage waveform supplied from the common electrode driving circuit 24, Vcom* denotes a common voltage waveform which is observed at the common electrode line 16 (or the common electrode 17), Vsh denotes a voltage waveform supplied to the transparent conductive film 2, and Vsh* is a voltage waveform which is observed at the transparent conductive film 2. In addition, in FIGS. 8A and 8B, since a common symmetry method such as a dot inversion method is employed as the AC driving method, the common voltage waveform shows a constant waveform having no variations.

Parasitic capacitors are respectively formed between the scanning line 21 and the common electrode line 16, and between the image line and the common electrode line 16. Therefore, as shown in FIGS. 8A and 8B, when a level variation occurs at the scanning voltage Vgn and the image voltage Vdm, this level variation causes a voltage variation to occur at the common voltage Vcom of the common electrode line 16 (or the common electrode 17) due to the capacitive coupling, thereby generating a spike-shaped voltage Vcom*. In addition, a voltage variation also occurs at a voltage of the transparent conductive film 2 to which the common voltage is supplied, and thereby the spike-shaped voltage occurring at the common electrode 17 is superposed on the voltage Vsh supplied to the transparent conductive film 2. The voltage Vsh* observed at the transparent conductive film 2 is a voltage where the spike-shaped voltage is superposed on the voltage Vsh supplied to the transparent conductive film 2. As a result, since the voltage noise is superposed on signals of other electronic devices (for example, a capacitance touch panel) disposed around the liquid crystal display devices, characteristics of the electronic devices are deteriorated by hindering normal operations of the electronic devices.

Figure 5A:
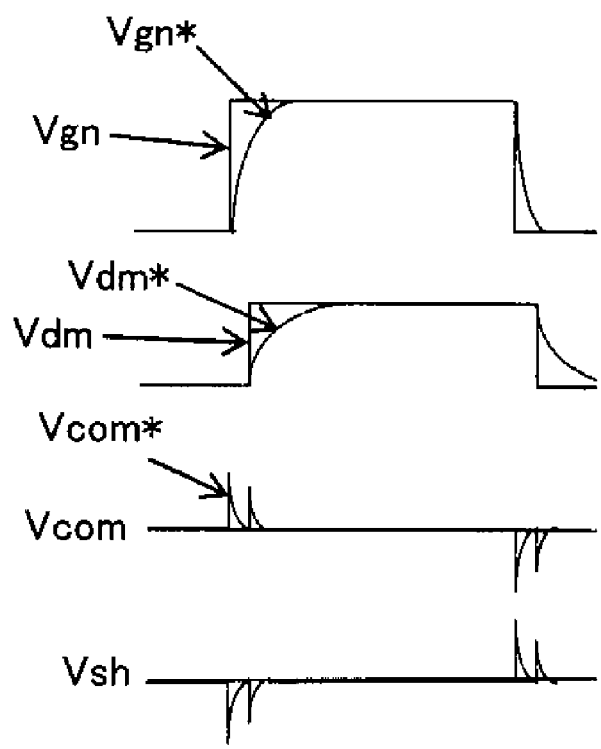
Figure 5B:
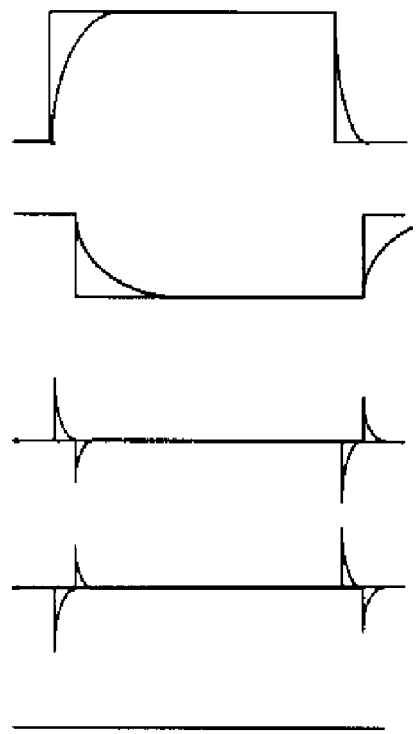

FIGS. 5A and 5B are waveform diagrams illustrating voltage waveforms of the respective parts of the liquid crystal display device according to the present embodiment, wherein FIG. 5A shows voltage waveforms when positive driving is performed, and FIG. 5B shows voltage waveforms when negative driving is performed.

In addition, in FIGS. 5A and 5B, the reference numerals Vgn, Vgn*, Vdm, Vdm*, Vcom, Vcom*, Vsh and Vsh* are the same voltage waveforms as the voltage waveforms described in FIGS. 8A and 8B. In FIGS. 5A and 5B as well, since a common symmetry method such as a dot inversion method is employed as the AC driving method, the common voltage waveform shows a constant waveform having no variations.

In the present embodiment as well, when a level variation occurs at the scanning voltage Vgn and the image voltage Vdm, this level variation causes a voltage variation to occur at the common voltage Vcom of the common electrode line 16 (or the common electrode 17) due to the capacitive coupling, thereby generating a spike-shaped voltage Vcom*.

However, in the present embodiment, as shown in the common voltage Vcom* in FIGS. 5A and 5B, a voltage with a reverse phase to the spike-shaped voltage Vcom* is generated using the inverting amplification circuit shown in FIG. 4.

As shown in the voltage Vsh in FIGS. 5A and 5B, the voltage Vsh where the generated voltage (an AC component) with the reverse phase is superposed on the common voltage (a DC component) is applied to the transparent conductive film 2 from the AC voltage generation circuit 19. The spike-shaped voltage occurring at the transparent conductive film 2 due to the spike-shaped voltage Vcom* generated at the common voltage Vcom is cancelled out by the voltage with the reverse phase, and thereby a voltage variation is suppressed. Therefore, as shown in FIGS. 5A and 5B, the voltage Vsh* observed at the transparent conductive film 2 can be made to be a voltage corresponding to a DC level.

As a result, it is possible to reduce superposition of voltage noise on signals of other electronic devices (for example, a capacitance touch panel) disposed around the liquid crystal display device, and to thereby reduce influence exerted on the electronic devices.

In addition, the resistive elements Ra and Rb have any constant value which is varied depending on resistance values of the respective lines or the transparent conductive film 2, or a capacitance value between those of the transparent conductive film 2 and the common electrode, but values thereof are determined such that the above-described voltage Vsh* is closest to a DC level.

Figure 6:
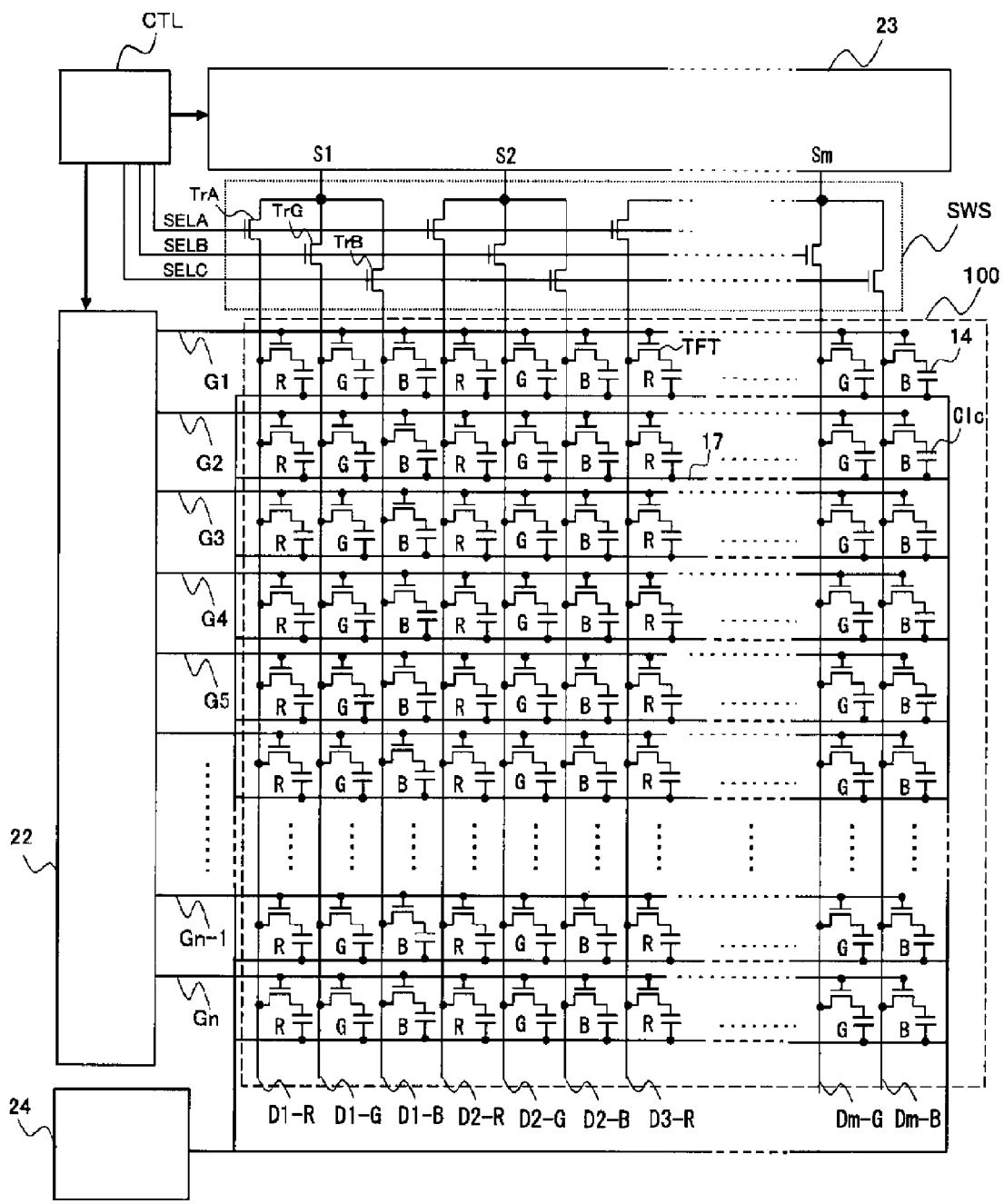
FIG. 6 is a diagram illustrating an equivalent circuit of a modified example of the liquid crystal display device according to the embodiment of the present invention.

FIG. 6 is a diagram illustrating an equivalent circuit of a modified example of the liquid crystal display device according to the embodiment of the present invention.

In the liquid crystal display device shown in FIG. 6, each pixel includes a red sub-pixel, a green sub-pixel, and a blue sub-pixel. In addition, in the liquid crystal display device shown in FIG. 6, an RGB switch circuit SWS is connected to the respective output terminals S1 to Sm of the image line driving circuit 23, and, by the use of the RGB switch circuit SWS, image voltages output from the image line driving circuit 23 are distributed into R (red) image lines D1-R to Dm-R, G (green) image lines D1-G to Dm-G, and B (blue) image lines D1-B to Dm-B.

The RGB switch circuit SWS includes switching transistors TrA connected between the R (red) image lines D1-R to Dm-R and the image line driving circuit 23, switching transistors TrB connected between the G (green) image lines D1-G to Dm-G and the image line driving circuit 23, and switching transistors TrC connected between the B (blue) image lines D1-B to Dm-B and the image line driving circuit 23.

The switching transistors TrA, TrB and TrC are controlled by switching signals SELA, SELB and SELC output from the display control circuit CTL.

The switching transistors TrA are controlled so as to be turned on and off by the switching signal SELA, the switching transistors TrB are controlled so as to be turned on and off by the switching signal SELB, and the switching transistors TrC are controlled so as to be turned on and off by the switching signal SELC.

In the RGB switch circuit SWS, the switching transistors TrA are turned on and the switching transistors TrB and the switching transistors TrC are turned off during a first period of one horizontal scanning period, and thereby an R image voltage is output to the R image lines D1-R to Dm-R from the image line driving circuit 23. The switching transistors TrB are turned on and the switching transistors TrA and the switching transistors TrC are turned off during a second period of one horizontal scanning period, and thereby a G image voltage is output to the G image lines D1-G to Dm-G from the image line driving circuit 23. In addition, the switching transistors TrC are turned on and the switching transistors TrA and the switching transistors TrB are turned off during a third period of one horizontal scanning period, and thereby a B image voltage is output to the B image lines D1-B to Dm-B from the image line driving circuit 23.

According to the liquid crystal display device shown in FIG. 6, a spike-shaped voltage occurs at the voltage Vsh of the transparent conductive film 2 due to level variations of the switching signals SELA, SELB and SELC in addition to level variations of the scanning voltage Vgn and the image voltage Vdm. According to the liquid crystal display device shown in FIG. 6, the spike-shaped voltage is cancelled out so as to suppress a voltage variation, and thereby the voltage Vsh* observed at the transparent conductive film 2 can be made to be a voltage corresponding to a DC level.

As a result, it is possible to reduce superposition of voltage noise on signals of other electronic devices (for example, a capacitance touch panel) disposed around the liquid crystal display device, and to thereby reduce influence exerted on the electronic devices.

As described above, voltage variations occur at the transparent conductive film 2 and the common electrode line 16 which are capacitively coupled due to level variations of the scanning voltage Vgn and the image voltage Vdm in the liquid crystal display device in the related art. Therefore, the voltage variation of the transparent conductive film 2 generates electromagnetic wave noise such that the noise is superposed on signals of other electronic devices (for example, a capacitance touch panel) disposed around the liquid crystal display device, thereby hindering normal operations of the electronic devices.

In contrast, according to the present embodiment, there is further provided the inverting amplification circuit which has a voltage variation generated at a voltage of the common electrode line 16 (or the common electrode 17) due to level variations of the scanning voltage Vgn, the image voltage Vdm, or the switching signals SELA, SELB and SELC, as an input signal. At the same timing as in the voltage variation generated at the common electrode line 16, the inverting amplification circuit generates a voltage with a reverse phase to the voltage variation, and a voltage where the voltage (an AC component) with the reverse phase is superposed on the common voltage (a DC component) is applied to the transparent conductive film 2. A voltage variation occurring at the transparent conductive film 2 due to the voltage variation generated at the common electrode line 16 is cancelled out by the voltage with the reverse phase. Thereby, it is possible to reduce influence exerted on other electronic devices (for example, a capacitance touch panel) disposed around the liquid crystal display device.

With the application of the present embodiment, it is possible to omit noise countermeasures (the low resistance shield layer is disposed at the rear surface of the touch panel and is connected to the ground potential GND) which are performed by other electronic devices (for example, a capacitance touch panel) disposed around the liquid crystal display device, and thus it is possible to achieve reduction in costs exceeding the addition of the AC voltage generation circuit 19 and to improve display performance (luminance) in application apparatuses using the liquid crystal display device such as a smart phone.

While there have been described what are at present considered to be certain embodiments of the invention, it will be understood that various modifications may be made thereto, and it is intended that the appended claims cover all such modifications as fall within the true spirit and scope of the invention.

What is claimed is:
1. A display device comprising:
   a display panel comprising:
      a plurality of pixels, each having a pixel electrode; and
      a common electrode;
      a transparent conductive film disposed at a surface on a viewer side of the display panel for noise shielding; and
   a voltage generation unit configured to supply a voltage having an AC component superposed on a DC component to said transparent conductive film,
   wherein the AC component supplied to the transparent conductive film comprises a voltage with a reverse polarity with respect to a spike-shaped voltage occurring at the common electrode, and
   wherein the AC component supplied to the transparent conductive film has a waveform which is a reverse phase to the spike-shaped voltage occurring at the common electrode.
2. The display device according to claim 1, wherein the display panel further comprises:
   a common voltage line that supplies a common voltage to the common electrode; and
   an inverting amplification circuit, wherein a voltage with a reverse polarity with respect to an input voltage from the common electrode or the common voltage line is generated and output to the transparent conductive film.
3. The display device according to claim 1,
   wherein the display panel further comprises an image line configured to supply an image voltage to the plurality of pixels, and
   wherein the AC component supplied to the transparent conductive film is the voltage which is varied so as to have a reverse polarity to a spike-shaped voltage occurring at the transparent conductive film due to a level variation of the image voltage supplied to the image line.
4. The display device according to claim 1, wherein the display panel further comprises a scanning line that inputs a scanning voltage to each of the pixels, and
   wherein the AC component supplied to the transparent conductive film is the voltage which is varied so as to have a reverse polarity to a spike-shaped voltage occurring at the transparent conductive film due to a level variation of the scanning voltage supplied to the scanning line.
5. The display device according to claim 1, further comprising a polarizer provided on the transparent conductive film,
   wherein the display panel is a liquid crystal display panel which comprises a pair of substrates and a liquid crystal layer interposed between the pair of substrates, and
   wherein the transparent conductive film is provided at a surface on a viewer side of the display panel of the pair of substrates.
6. The display device according to claim 1, further comprising a polarizer provided on the transparent conductive film,
   wherein the display panel is a liquid crystal display panel comprising:
   a pair of substrates;

a liquid crystal layer interposed between the pair of substrates;

a plurality of image lines that input image voltages to the plurality of pixels;

a plurality of scanning lines that input scanning voltages to the plurality of pixels; and an image line driving circuit that supplies the image voltages to the respective image lines, wherein each of the pixels comprises a first color sub-pixel, a second color sub-pixel, and a third color sub-pixel, wherein the plurality of image lines comprise an image line A for the first color sub-pixel, an image line B for the second color sub-pixel, and an image line C for the third color sub-pixel, wherein the display device further comprises an RGB switch circuit that distributes image voltages output from the image line driving circuit into the image line A, the image line B or the image line C, wherein one horizontal scanning period is divided into a first period, a second period, and a third period, which are continuous periods, and wherein the RGB switch circuit supplies the image voltages output from the image line driving circuit to the image line A during the first period, to the image line B during the second period, and to the image line C during the third period.

7. The display device according to claim 6, wherein the AC component supplied to the transparent conductive film is the voltage which is varied so as to have a reverse polarity to a spike-shaped voltage occurring at the transparent conductive film due to a level variation of the image voltage supplied to the image line.

8. The display device according to claim 6, wherein the AC component supplied to the transparent conductive film is the voltage which is varied so as to have a reverse polarity to a spike-shaped voltage occurring at the transparent conductive film due to a level variation of the scanning voltage supplied to the scanning line.

9. The display device according to claim 6, wherein the AC component supplied to the transparent conductive film is the voltage which is varied so as to have a reverse polarity to a spike-shaped voltage occurring at the transparent conductive film due to a level variation of a switching signal input to the RGB switch circuit.

10. A display device comprising:
a display panel comprising:
a plurality of pixels; and
an image line configured to supply an image signal to the plurality of pixels;

a transparent conductive film disposed at a surface on a viewer side of the display panel for noise shielding; and a voltage generation unit configured to supply a voltage having an AC component superposed on a DC component to said transparent conductive film, wherein the AC component supplied to the transparent conductive film comprises a voltage with a reverse polarity with respect to a spike-shaped voltage occurring at the transparent conductive film due to a level variation of the image signal supplied to the image line so as to cancel out effects of the spike-shaped voltage on the transparent conductive film, and wherein the AC component supplied to the transparent conductive film has a waveform which is a reverse phase to the spike-shaped voltage occurring at the transparent conductive film.

11. A display device comprising:
a display panel comprising:
a plurality of pixels; and
a scanning line configured to input a scanning voltage to each of the plurality of pixels;

a transparent conductive film disposed at a surface on a viewer side of the display panel for noise shielding; and a voltage generation unit configured to supply a voltage where an AC component is superposed on a DC component is supplied to said transparent conductive film, wherein the AC component supplied to the transparent conductive film comprises a voltage with a reverse polarity with respect to a spike-shaped voltage occurring at the transparent conductive film due to a level variation of the scanning voltage supplied to the scanning line so as to cancel out effects of the spike-shaped voltage on the transparent conductive film, and wherein the AC component supplied to the transparent conductive film has a waveform which is a reverse phase to the spike-shaped voltage occurring at the transparent conductive film.

* * * * *